United States Patent
Dunn

(10) Patent No.: US 7,351,275 B2
(45) Date of Patent: Apr. 1, 2008

(54) CARBON MONOXIDE PRODUCTION PROCESS

(75) Inventor: Graeme John Dunn, Onslow Village (GB)

(73) Assignee: The BOC Group, Inc., Murray Hill, NJ (US)

( * ) Notice: Subject to any disclaimer, the term of this patent is extended or adjusted under 35 U.S.C. 154(b) by 624 days.

(21) Appl. No.: 11/018,600

(22) Filed: Dec. 21, 2004

(65) Prior Publication Data

US 2006/0130647 A1   Jun. 22, 2006

(51) Int. Cl.
*B01D 53/22* (2006.01)
*C01B 31/18* (2006.01)
*C01B 3/50* (2006.01)

(52) U.S. Cl. .................. 95/51; 95/45; 95/52; 95/55; 96/8; 96/10; 423/418.2; 423/651; 423/652; 48/198.3

(58) Field of Classification Search ............ 95/45, 95/51, 52, 55; 96/8, 10; 423/418.2, 437.1, 423/651, 652; 48/198.2, 198.3
See application file for complete search history.

(56) References Cited

U.S. PATENT DOCUMENTS

| | | | |
|---|---|---|---|
| 4,048,091 A | 9/1977 | Barnaba | |
| 4,492,769 A | 1/1985 | Blanchard et al. | |
| 4,522,894 A | 6/1985 | Hwang et al. | |
| 4,537,873 A | 8/1985 | Kato et al. | |
| 4,680,282 A | 7/1987 | Blanchard et al. | |
| 4,844,837 A | 7/1989 | Heck et al. | |
| 4,897,253 A | 1/1990 | Jenkins | |
| 4,927,799 A | 5/1990 | Matsumoto et al. | |
| 5,013,705 A | 5/1991 | Koberstein et al. | |
| 5,023,276 A | 6/1991 | Yarrington et al. | |
| 5,102,645 A * | 4/1992 | Fisher et al. ............. 423/418.2 |
| 5,232,889 A | 8/1993 | Blanchard et al. | |
| 5,368,835 A | 11/1994 | Choudhary et al. | |
| 5,431,855 A | 7/1995 | Green et al. | |
| 5,441,581 A | 8/1995 | Van den Sype et al. | |
| 5,500,149 A | 3/1996 | Green et al. | |
| 5,510,056 A | 4/1996 | Jacobs et al. | |
| 5,580,536 A | 12/1996 | Yao et al. | |

(Continued)

FOREIGN PATENT DOCUMENTS

EP    0 303 438 A2    2/1989

(Continued)

OTHER PUBLICATIONS

Sintered Ceria: A New Dense and Fine Grained Ceramic Material by J.F. Baumard, C. Gault and A. Atgoitia; Journal of the Less-Common Metals, 127 (1987) 125-130.

(Continued)

*Primary Examiner*—Jason M. Greene
(74) *Attorney, Agent, or Firm*—Philip H. Von Neida

(57) ABSTRACT

The present invention provides for a process for producing carbon monoxide. A feed gas stream of hydrogen, carbon monoxide and carbon dioxide is directed to a membrane unit which separates the feed gas stream into two streams. The stream containing carbon monoxide is directed to second membrane unit for further purification and the steam containing the carbon dioxide and hydrogen is fed to a reverse shift reactor to produce more carbon monoxide. The carbon monoxide recovered from the reverse shift reactor is purified in a third membrane unit and directed back to the first membrane unit and is further purified and recovered as additional carbon monoxide product.

12 Claims, 1 Drawing Sheet

U.S. PATENT DOCUMENTS

| | | | |
|---|---|---|---|
| 5,639,401 A | | 6/1997 | Jacobs et al. |
| 5,648,582 A | | 7/1997 | Schmidt et al. |
| 5,658,497 A | | 8/1997 | Kumar et al. |
| 5,785,774 A | | 7/1998 | Van Den Sype et al. |
| 5,856,585 A | | 1/1999 | Sanfilippo et al. |
| 5,883,138 A | | 3/1999 | Hershkowitz et al. |
| 5,965,481 A | | 10/1999 | Durand et al. |
| 5,976,721 A | | 11/1999 | Limaye |
| 6,051,162 A | | 4/2000 | Van den Sype et al. |
| 6,090,312 A | * | 7/2000 | Ziaka et al. ................. 252/373 |
| 6,214,066 B1 | * | 4/2001 | Nataraj et al. ................. 95/45 |
| 6,254,807 B1 | | 7/2001 | Schmidt et al. |
| 6,329,434 B1 | | 12/2001 | Wen et al. |
| 6,455,597 B2 | | 9/2002 | Hohn et al. |
| 6,458,334 B1 | | 10/2002 | Tamhankar et al. |
| 6,579,331 B1 | * | 6/2003 | Ho ................................ 95/51 |
| 6,783,750 B2 | * | 8/2004 | Shah et al. ................. 423/652 |
| 6,863,879 B2 | * | 3/2005 | Rojey et al. ................. 423/651 |
| 2001/0041159 A1 | | 11/2001 | Tamhankar et al. |
| 2003/0113244 A1 | * | 6/2003 | Dupont et al. ............ 423/418.2 |

FOREIGN PATENT DOCUMENTS

| | | |
|---|---|---|
| EP | 0 524 643 A1 | 1/1993 |
| EP | 0 548 679 A1 | 6/1993 |
| EP | 0 640 561 A1 | 3/1995 |
| EP | 0 781 591 A2 | 7/1997 |
| EP | 1 134 188 A2 | 9/2001 |
| GB | 1399137 | 6/1975 |
| JP | 11-342334 | 12/1999 |
| WO | WO 93/01130 | 1/1993 |
| WO | WO 98/35908 | 8/1998 |
| WO | WO 99/48805 | 9/1999 |

OTHER PUBLICATIONS

"A Comparative Study of Oxygen Storage Capacity Over Ce 0.6 Zr 0.4 02 Mixed Oxides Investigated by Temperature-Programmed Reduction and Dynamic OSC Measurements,".

Hickey et al., Catalysis Letters, vol. 72, No. 1-2, pp. 45-50 (2001).

"Effect of Ceria Structure on Oxygen Migration for Rh/Ceria Catalysts," by Cordatos et al., J. Phys. Chem., vol. 100, No. 2, 785-789 (1996).

"Tape Cast Solid Oxide Fuel Cells for the Direct Oxidation of Hydrocarbons," Park et al., Journal of the Electrochemical Society, 148 (5), pp. A443-A447 (2001).

"Catalytic Partial Oxidation of Methane to Synthesis Gas Over Ni-Ce02," Zhu et al., Applied Catalysis A: General 208, (2001) pp. 403-417.

"Catalytic Partial-Oxidation of Methane on a Ceria-Supported Platinum Catalyst for Application in Fuel Cell Electric Vehicles," Pino et al., Applied Catalysis A: General 225, (2002) pp. 63-75.

K. Otsuka, T. Ushiyama and I. Yamanaka, "Partial Oxidation of Methane Using the Redox of Cerium Oxide," Chemistry Letters, pp. 1517-1520, 1993.

E.S. Putna, J. Stubenrauch, J.M. Vohs, and R.J. Gorte, "Ceria-Based Anodes for the Direct Oxidation of Methane in Solid Oxide Fuel Cells," LANGMUIR, vol. 11, No. 12, 1995, pp. 4832-4837.

* cited by examiner

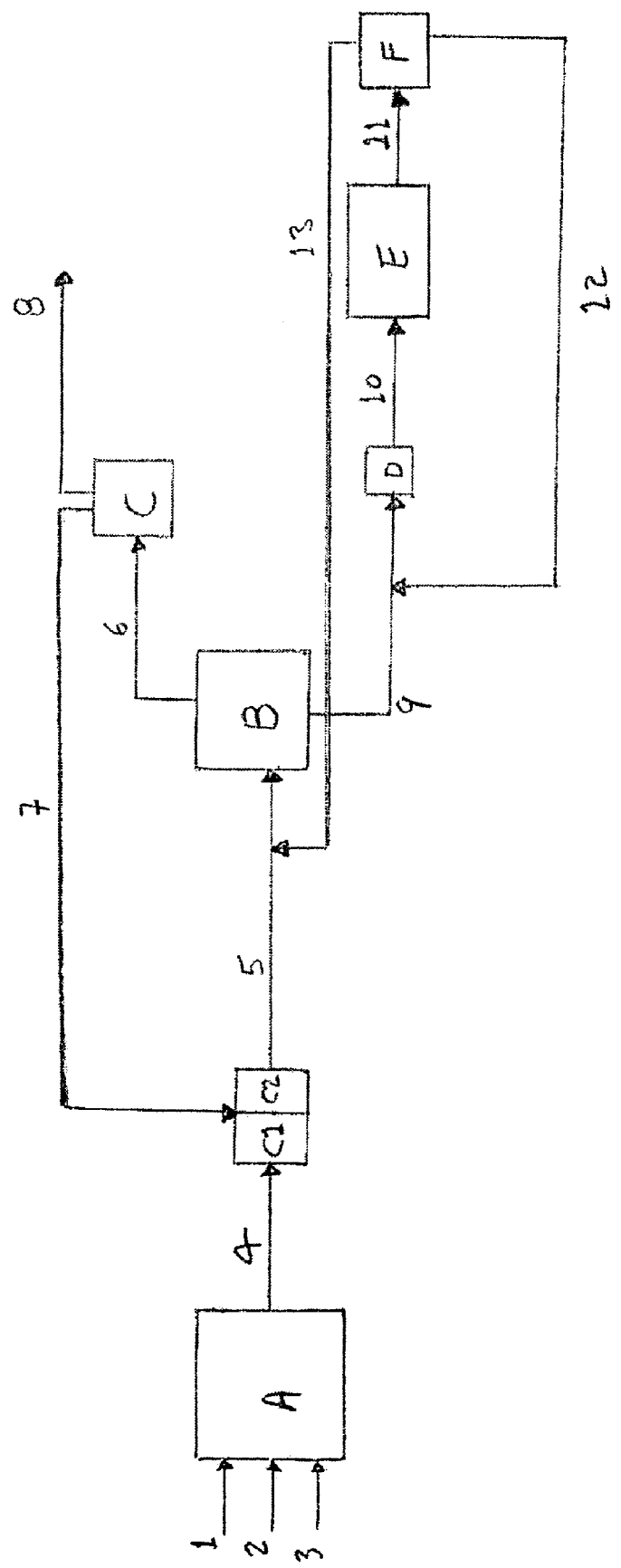

CARBON MONOXIDE PRODUCTION PROCESS

BACKGROUND OF THE INVENTION

The present application provides for an improved method of enhancing carbon monoxide production while minimizing the associated hydrogen byproduct. Carbon dioxide is added to a monolith reactor producing syngas by catalytic partial oxidation of a hydrocarbon feed to reduce the hydrogen content and increase carbon monoxide content of the syngas.

Membranes are employed to separate the hydrogen and carbon dioxide from the carbon monoxide product and a reverse shift reactor is further employed to convert the hydrogen and carbon dioxide byproducts to additional carbon monoxide.

Certain industrial applications require a carbon monoxide purity of 98 to 99%, for example acetic acid manufacture. The hydrogen byproduct associated with carbon monoxide production has little economic value or at best fuel value.

The conversion of hydrocarbons to hydrogen and carbon monoxide containing gases is well known in the art. Examples of such processes include catalytic steam reforming, autothermal catalytic reforming, catalytic partial oxidation and non-catalytic partial oxidation. Each of these processes has advantages and disadvantages and produce various ratios of hydrogen and carbon monoxide, also known as synthesis gas.

Catalytic partial oxidation is an exothermic reaction wherein a hydrocarbon gas, such as methane, and an oxygen-containing gas, such as air, are contacted with a catalyst at elevated temperatures to produce a reaction product containing high concentrations of hydrogen and carbon monoxide. The catalysts used in these processes are typically noble metals, such as platinum or rhodium, and other transition metals, such as nickel on a suitable support.

Partial oxidation processes convert hydrocarbon containing gases, such as natural gas or naphtha to hydrogen ($H_2$), carbon monoxide (CO) and other trace components such as carbon dioxide ($CO_2$), water ($H_2O$) and other hydrocarbons. The process is typically carried out by injecting preheated hydrocarbons and an oxygen-containing gas into a combustion chamber where oxidation of the hydrocarbons occurs with less than stoichiometric amounts of oxygen for complete combustion. This reaction is conducted at very high temperatures, such as in excess of 700° C. and often in excess of 1,000° C., and pressures up to 150 atmospheres. In some reactions, steam or $CO_2$ can also be injected into the combustion chamber to modify the synthesis gas product and to adjust the ratio of $H_2$ to CO.

More recently, partial oxidation processes have been disclosed in which the hydrocarbon gas is contacted with the oxygen-containing gas at high space velocities in the presence of a catalyst such as a metal deposited on a monolith support. The monolith supports are impregnated with a noble metal such as platinum, palladium or rhodium, or other transition metals such as nickel, cobalt, chromium and the like. Typically, these monolith supports are prepared from solid refractory or ceramic materials such as alumina, zirconia, magnesia and the like.

SUMMARY OF THE INVENTION

The present invention provides for an improved process for producing carbon monoxide from a monolith reactor comprising the steps:

a) directing a feed gas mixture to the monolith reactor;
b) directing the product gas from the monolith reactor comprising carbon monoxide, hydrogen and carbon dioxide to a first membrane unit;
c) separating the carbon monoxide from the product gas in the first membrane unit;
d) directing the carbon monoxide to a second membrane unit;
e) directing the carbon dioxide and hydrogen from the first membrane unit to a reverse shift reactor;
f) directing a second product gas from the reverse shift reactor comprising carbon monoxide, hydrogen and carbon dioxide to a third membrane unit;
g) separating the carbon monoxide from the second product gas in the third membrane unit;
h) feeding the carbon monoxide rich stream recovered from the third membrane unit to the first membrane unit;
i) directing the carbon dioxide and hydrogen from the third membrane unit to a reverse shift reactor; and
j) recovering the carbon monoxide from step d.

A monolith reactor produces syngas by catalytic partial oxidation of a hydrocarbon feed. Since carbon monoxide is the desired product, carbon dioxide is added to the reactor in order to reduce the hydrogen content and increase the carbon monoxide content in the syngas.

Membranes are used to separate the hydrogen and carbon dioxide from the carbon monoxide product stream. The membranes in the first, second and third membrane units are conventional in design, and typically contain permeable hollow fibers allowing for separation of a gas from a gas mixture. The membrane units function by allowing separation of gas components from a gas mixture on the basis of their relative permeability through the membrane. The less permeable components of the gas mixture will concentrate in the higher pressure side of the membrane in the retentate stream, whereas the more permeable components concentrate on the lower pressure side of the membrane in the permeate stream. Additionally, a reverse shift reactor is used to convert the hydrogen and carbon dioxide byproducts of the partial oxidation reaction to form additional carbon monoxide. This process will give almost complete carbon to carbon monoxide conversion, while minimizing hydrogen byproduct.

Alternatively, the present invention provides for an improved process for purifying carbon monoxide comprising the steps:

a) directing a gas stream comprising carbon monoxide, hydrogen and carbon dioxide to a first membrane unit;
b) separating the carbon monoxide from the carbon dioxide and hydrogen in the first membrane unit;
c) directing the carbon monoxide to a second membrane unit, wherein impurities are removed from the carbon monoxide;
d) directing the carbon dioxide and hydrogen from the first membrane unit to a reverse shift reactor;
e) directing a second product gas from the reverse shift reactor comprising carbon monoxide, hydrogen and carbon dioxide to a third membrane unit;
f) separating the carbon monoxide from the second product gas in the third membrane unit;
g) feeding the carbon monoxide rich stream recovered from the third membrane unit to the first membrane unit for further purification;
h) directing the carbon dioxide and hydrogen from the third membrane unit to a reverse shift reactor; and
e) recovering the carbon monoxide from step c.

BRIEF DESCRIPTION OF THE DRAWINGS

The drawing is a schematic diagram of a monolith reactor based carbon monoxide production plant.

DETAILED DESCRIPTION OF THE INVENTION

Reference will now be made to the FIGURE where there is shown an embodiment which describes the basic operation of the present invention. Natural gas is fed through line 1; oxygen is fed through line 2 and carbon dioxide is fed through line 3 receptively to the monolith reactor A. The monolith reactor comprises a metal catalyst consisting essentially of a metal supported by a ceria coating disposed on a ceramic monolith. The metal is selected from the group consisting of nickel, cobalt, iron, platinum, palladium, iridium, rhenium, ruthenium, rhodium and osmium. The ceramic material is selected from the group consisting of zirconia, alumina, yttria, titania, magnesia, ceria and cordierite. Ceria coating has a weight percentage between about 1% and about 30% with respect to the ceramic monolith. In one embodiment, the ceramic is selected from the group consisting of zirconia, yttria, titania, magnesia, ceria and cordierite. A further description of this metal catalyst monolith ceramic may be found in co-pending application Ser. No. 10/143,705 published on Jan. 9, 2003, as US 2003/0007926A1 to Jiang et al.

The product gas which comprises carbon monoxide, hydrogen and carbon dioxide with small amounts of methane, water, nitrogen and argon present therein is directed to a quench unit C1 along line 4. The hydrogen to carbon dioxide ratio of this product gas is in the range of about 0.1 to about 10 but is typically about 1. The hot product gas is initially quenched with water in C1 from a temperature of about 1000° C. to about 400-800° C. The syngas product gas can be further cooled in either a heat exchanger to produce steam or to provide heat to other process streams. The result of the quenching process is that the syngas product gas will be about ambient temperature. Any water that is condensed from the quench is separated from the product gas stream by conventional means.

The syngas product stream enters compressor C2 where it is compressed to 10 to about 50 bar. This range will be determinative upon the final carbon monoxide product pressure required. As a result of the compression and associated cooling, additional water is condensed and separated by conventional means. In some instances, a deoxo reactor, not shown, is included either upstream or downstream of the compressor to remove any trace unreacted oxygen.

The compressed syngas is directed to a first membrane unit B along line 5. There hydrogen, carbon dioxide and water preferentially permeate to the low pressure side of the membrane as the carbon monoxide lean permeate stream. The bulk of the carbon monoxide remains on the high pressure side of the membrane in the carbon monoxide rich retentate stream. This high pressure stream passes to a second membrane unit C through line 6 where the first carbon monoxide stream is further purified to the product carbon monoxide stream and is recovered as product carbon monoxide through line 8. This product carbon monoxide may be sent to external storage or utilized in other processes depending upon the facility where it is produced. The permeate from this second membrane unit C which is relatively rich in carbon monoxide is recycled via line 7 to the inlet of the syngas compressor C2.

The permeate stream from the first membrane, rich in hydrogen and carbon monoxide is sent to the shift compressor D via line 9. This permeate stream is compressed to a pressure close to that of the syngas compressor C2 of 10 to 50 bar. Water is condensed and separated by conventional means as a result of the compressions and associated cooling. The stream is then heated through a combination of heat exchange from other process streams and external heating (e.g. in a fired heater) and is passed through line 10 to the reverse shift reactor E.

The concentrations of hydrogen and carbon dioxide are high and those of carbon monoxide and water are low so a reverse shift reaction ensues, and a portion of the hydrogen and carbon dioxide are converted to carbon monoxide and water. The reverse shift reaction is endothermic and raising the inlet temperature of the gas stream will increase the conversion. Typically this inlet temperature is about 500° to about 1000° C. The hydrogen to carbon dioxide ratio in the gas stream entering the reverse shift reactor will be in the range of about 0.1 to about 10, but is typically about 1. The ratio can be adjusted by the addition of supplementary carbon dioxide prior to the reverse shift reactor if so desired.

The reverse shift reactor could be a catalyst bed, a monolith reactor or even integrated within an existing reformer. The catalyst for the reverse shift reaction would preferably be a conventional steam reforming catalyst or a noble metal catalyst.

The product gas stream from the reverse shift reactor E is cooled, first against the feed stream to the reverse shift reactor, and secondly against a flow of cooling water or air. Any condensed water is removed from the stream by conventional means. The product gas stream from the reverse shift reactor E is directed along line 11 to a third membrane unit F. Hydrogen, carbon dioxide and any remaining water preferentially permeate to the low pressure side of the membrane. The carbon monoxide rich high pressure retentate stream from this third membrane unit F is fed to the first membrane unit through line 13 and line 5 to provide additional carbon monoxide product. The low pressure permeate stream is recycled via line 12 to the inlet of the shift compressor through line 9.

While this invention has been described with respect to particular embodiments thereof, it is apparent that numerous other forms and modifications of the invention will be obvious to those skilled in the art. The appending claims in this invention generally should be construed to cover all such obvious forms and modifications which are within the true spirit and scope of the present invention.

Having thus described the invention, what I claim is:

1. An improved process for producing carbon monoxide from a monolith reactor comprising the steps:
    a) directing a feed gas mixture to said monolith reactor;
    b) directing a first product gas from said monolith reactor comprising carbon monoxide, hydrogen and carbon dioxide to a first membrane unit;
    c) separating said carbon monoxide from said first product gas in said first membrane unit;
    d) directing said carbon monoxide to a second membrane unit;
    e) directing the carbon dioxide and hydrogen from said first membrane unit to a reverse shift reactor;
    f) directing a second product gas from said reverse shift reactor comprising carbon monoxide, hydrogen and carbon dioxide to a third membrane unit;
    g) separating the carbon monoxide from the carbon dioxide and hydrogen in said third membrane unit;

h) feeding the carbon monoxide rich stream recovered from said third membrane unit to said first membrane unit for further purification;

i) directing the carbon dioxide and hydrogen from said third membrane unit to said reverse shift reactor; and j) recovering the carbon monoxide from step c.

2. The process as claimed in claim 1 wherein said feed gas comprises a hydrocarbon gas, oxygen and carbon dioxide.

3. The process as claimed in claim 2 wherein said hydrocarbon gas is natural gas.

4. The process as claimed in claim 1 wherein said first membrane unit contains permeable hollow fibers.

5. The process as claimed in claim 4 wherein said second membrane unit and said third membrane unit are the same as said first membrane unit.

6. The process as claimed in claim 1 wherein said monolith reactor comprises a metal catalyst consisting essentially of a metal supported by a ceria coating disposed on a ceramic monolith wherein said metal is selected from the group consisting of nickel, cobalt, iron, platinum, palladium, iridium, rhenium, ruthenium, rhodium and osmium said ceramic is selected from the group consisting of zirconia, alumina, yttria, titania, magnesia, ceria and cordierite and said ceria coating has a weight % between about 5% and about 30% with respect to said monolith.

7. The process as claimed in claim 1 wherein said product gas is compressed before entering said first membrane unit.

8. The process as claimed in claim 6 wherein said product gas is quenched prior to being compressed.

9. An improved process for purifying carbon monoxide comprising the steps:

a) directing a gas stream comprising carbon monoxide, hydrogen and carbon dioxide to a first membrane unit;

b) separating said carbon monoxide from said carbon dioxide and hydrogen in said first membrane unit;

c) directing said carbon monoxide to a second membrane unit, wherein impurities are removed from said carbon monoxide;

d) directing said carbon dioxide and hydrogen from said first membrane unit to a reverse shift reactor;

e) directing a product gas from the reverse shift reactor comprising carbon monoxide, hydrogen and carbon dioxide to a third membrane unit;

e) separating the carbon monoxide from said product gas in said third membrane unit;

f) feeding the carbon monoxide rich stream recovered from said third membrane unit to said first membrane unit for further purification;

g) directing the carbon dioxide and hydrogen from said third membrane unit to said reverse shift reactor; and h) recovering said carbon monoxide from step c.

10. The process as claimed in claim 9 wherein said hydrocarbon gas is natural gas.

11. The process as claimed in claim 9 wherein said first membrane unit contains permeable hollow fibers.

12. The process as claimed in claim 9 wherein said second membrane unit and said third membrane unit are the same as said first membrane unit.

\* \* \* \* \*